United States Patent [19]

Lee

[11] Patent Number: 5,274,507
[45] Date of Patent: Dec. 28, 1993

[54] PARALLEL DATA ENCODING FOR MOVING MEDIA

[76] Inventor: Paul Lee, HCR62, Box 100K, Great Cacapon, W. Va. 25422

[21] Appl. No.: 761,168

[22] Filed: Sep. 9, 1991

[51] Int. Cl.$^5$ .............................................. G11B 5/09
[52] U.S. Cl. ..................... 360/39; 360/106; 360/77.05; 360/78.14
[58] Field of Search ............... 360/39, 77.02, 77.04, 360/77.05, 78.04, 78.12, 51, 106, 109, 53, 105, 75, 78.05, 98.01, 77.11, 77.07, 78.14; 371/38.1, 40.4, 40.1, 10.2

[56] References Cited

U.S. PATENT DOCUMENTS

| | | | |
|---|---|---|---|
| 4,722,085 | 1/1988 | Flora et al. | 371/38 |
| 4,914,656 | 4/1990 | Dunphy et al. | 371/10.2 |
| 4,974,156 | 11/1990 | Harding et al. | 364/200 |
| 5,084,789 | 1/1992 | Kamo et al. | 360/39 X |
| 5,189,578 | 2/1993 | Mori et al. | 360/77.02 X |
| 5,193,036 | 3/1993 | Green et al. | 360/77.05 X |

*Primary Examiner*—Steven Mottola
*Assistant Examiner*—Ali Neyzari

[57] ABSTRACT

A parallel data encoding method in single disk drive units. The method can be applied to both hard disc drives and floppies. None or little change is required in the Present Physical construction of disk drives. The invention permits standard error detection and correction methods. Construction of multiple heads per surface is also introduced to facilitate the parallel encoding of data for floppies and compact hard disc drive units and to decrease average track seek time.

1 Claim, 2 Drawing Sheets

PARALLEL DATA ENCODING FOR MOVING MEDIA

BACKGROUND OF THE INVENTION

1. Field of the Invention

The present invention relates to computer systems and, in particular, to improve internal data transfer rates of disk drive type of memories for use with computer systems.

2. Description of the Prior Art

Computers commonly include disk storage systems for secondary memory storage, having moving media on which data can be read or written to. Such disk storage systems are commonly referred to as disk drive units.

Typically, magnetic or optical disk drive units incorporate single or stacked commonly rotated disks for storing data on the surfaces. Data is recorded sequentially on circular data information tracks spaced radially apart on each surface. A magnetic transducer or an optical head reads or writes the data on each disk surface. The process of reading or writing such data to disks is a sequential process. A particular disk surface and track is selected and data is written to or read from the track. After this another track and/or surface is selected and the process is repeated.

A significant time loss, known as "cylinder skew" or "seek time", occurs when moving the head(s) between data tracks in different geometrical cylinders. In order to avoid cylinder skew time loss, data is frequently organized sequentially on tracks that are located in the same geometrical cylinder but on different surfaces.

Another time loss, known as "head skew", occurs when switching from a track on one surface to the next in the same cylinder. In practice the starting points of these surface data tracks are offset by several sector data units to account for this.

Disk drive units may have additional surfaces and tracks, referred to as "servo surfaces, tracks and heads", for controlling the positioning of the data heads over the data tracks. This invention is not concerned with servo control.

In part because of the sequential nature of the process and track and head skew delay, the data transfer rate to and from the disk surfaces is considerably slower than main computer memory.

To improve the data transfer rate from or to the disk surfaces, industry standard disk drive interfaces like "Integrated Drive Electronics" (IDE) and Small Computer System Interfaces (SCSI) frequently incorporate larger on-board buffer or cache memories which can hold several tracks of data read from the disk surface or written to it. This can significantly improve peak data transfer rates. However the actual average and continuous transfer rate from disk drives is still limited by the drive mechanism and its sequential data reading and writing method, head skew and track skew delays.

A significant performance increase has been developed using an array (a plurality) of disk drive units with coordinating external disk rotation electronics. An example of that is the Micropolis Corporation Parallel Drive Array, Model 1804 SCSI, that uses four parallel synchronized disk drive units and one redundant parity drive. Another example is that of U.S. Pat. No. 4,722,085 where 39 disk drive units are used to achieve a 32 bit parallel transfer rate—the other 7 being for error correction. Examples of other efforts in the array method are U.S. Pat. Nos. 4,914,656 and 4,974,156. These have mainly tried to to improve error detection and correction.

The array method is cumbersome both in physical size and the additional external coordinating electronics required. These factors make manufacturing costly for small business and personal computer market. The method does not address the head skew and cylinder skew problems inherent in individual drive units.

SUMMARY OF THE INVENTION

A principal object of this invention is to incorporate parallel data transfer from and/or to disk surfaces in single disk drive units to significantly improve data transfer rates to and from data tracks of disk surfaces.

The disk drive unit includes a plurality of disk data heads and one or more disk surfaces mounted for simultaneous rotation about an axis. The method uses a plurality of data write and/or read heads per disk drive to encode plural data digits in parallel, each of the plural heads writing and/or reading one data digit of each data word concurrently.

A further benefit of the invention is that the head skew time is eliminated for all plural heads used in writing and/or reading in parallel.

BRIEF DESCRIPTIONS OF DRAWINGS

FIG. 1 A disk storage system for illustrating parallel write and/or read process of the invention.

FIG. 2 A disk storage system with plural heads per surface for illustrating parallel read and/or write process in compact disk units.

DETAILED DESCRIPTION OF THE PREFERRED EMBODIMENTS

This invention introduces parallel data encoding within a signal disk drive unit.

Figure 1:
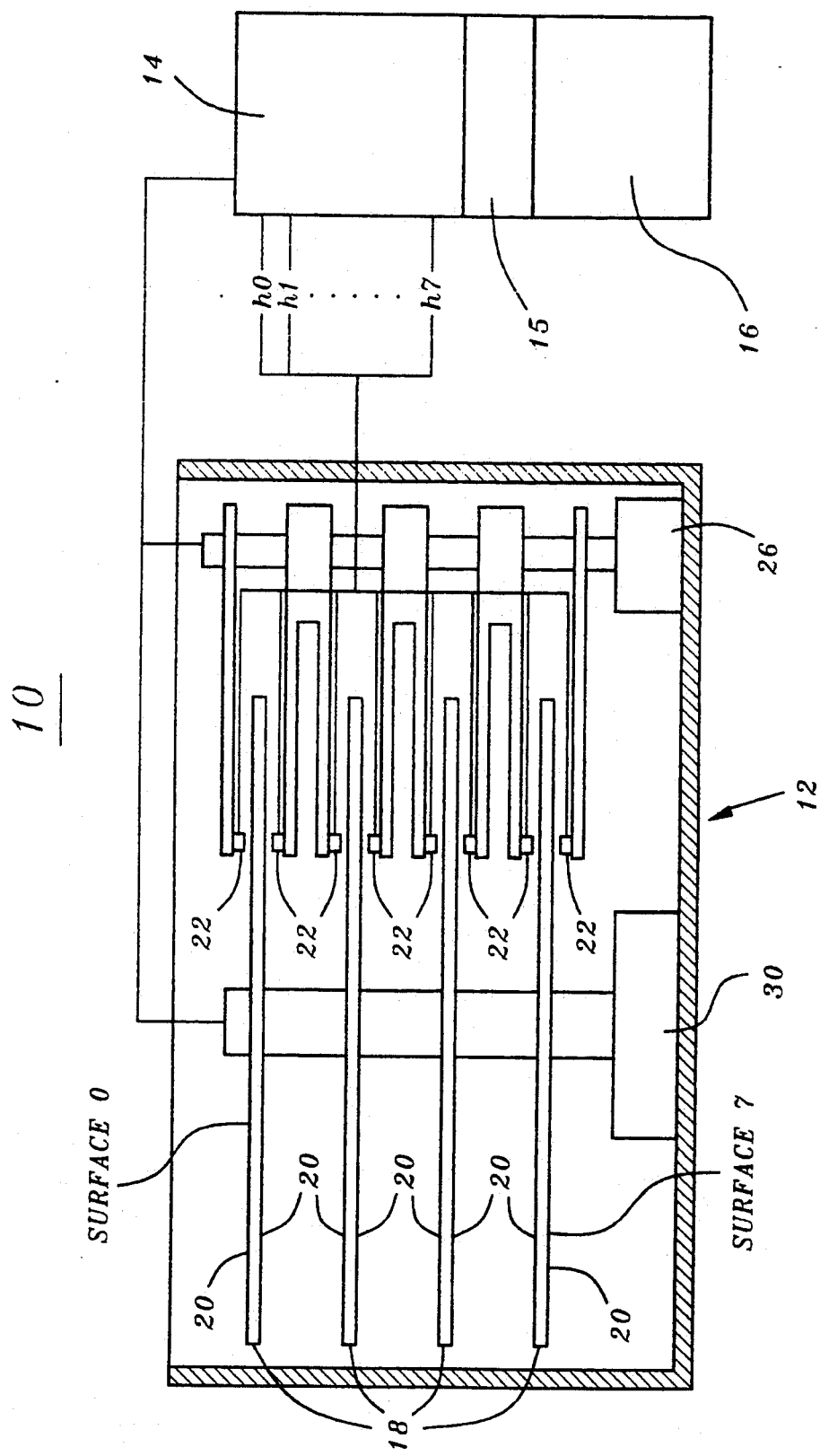

Referring to FIG. 1, the diagram shows a partially schematic diagram of a computer disk drive unit 10 with data storage medium 12, disk drive controller unit 14 and interface 16. The disk drive unit shown includes a stack of disks 18 mounted coaxially for common rotation by a spindle and motor assembly 30. Data write and/or read heads 22 are mounted with integral head arms 24 and drive motor 26 assembly which moves the heads to the required radial position.

Disks 18 include surfaces 20 with media for storing data. Data is stored on each of the surfaces 20 on plural concentric data tracks.

Eight heads are shown for illustration purposes. Any number of heads/surfaces could have served the purpose.

In the conventional process a file, or portions of it, are written and/or read in SEQUENTIAL fashion as a series of data digits on a selected track and surface. The interface 16 selects a particular data head from heads 22, and particular data track on the corresponding surface. A memory buffer or cache memory 15 is frequently used to temporarily hold data which is read from the disks or is to be written to the disks.

In a read process the track data or portion of is read by the specific head and sent through the corresponding signal channel selected from one of h0 through h7. The data is stored in a memory buffer or the interface cache memory and already in buffer or cache memory 15 the interface can quickly respond to read requests without the need for controller reading the specific track data.

In a write process the interface receives data to be written to a specific track or portion and a surface. Data is stored in a buffer or cache memory The controller then writes the data to the corresponding track and surface address.

In the preferred embodiment of this invention the data digits are written to and/or read from the tracks on drive surfaces in a parallel fashion using a plural number of heads concurrently.

In a read process the required data on plural tracks are read in parallel by the corresponding plural heads and sent through corresponding signal channels selected from h0 through h7. The data is stored in memory buffer or cache memory and then sent on to the computer.

In a write process the interface 16 receives data for writing and stores it in memory buffer or cache memory 15. The controller subsequently writes the data in parallel sending signals through corresponding channels selected from h0 through h7 to the corresponding plural heads.

The performance of this invention would be directly proportional to the number of heads used in parallel writing and/or reading. In FIG.-1 if all heads are used in parallel reading and/or writing, the transfer rate could be eight times the standard one-head-at-a-time sequential rate. For example, an eight bit data word would be written and or read in same time as a one bit transfer would occur in a conventional system. For sixteen heads at a time the transfer rate could be sixteen times as much, and so on.

A further significant benefit of this invention is the elimination of head skew time delay for all heads used in the parallel write and/or read process. i.e. no time is required for head switching for the plural heads used concurrently.

A partial problem may exist applying this invention to newer and smaller disk drive units, frequently having fewer surfaces but higher track and data densities. The fewer surfaces and heads would benefit less from the parallel data encoding of this invention.

A simple way to solve this problem is to construct plural heads per surface.

Figure 2:
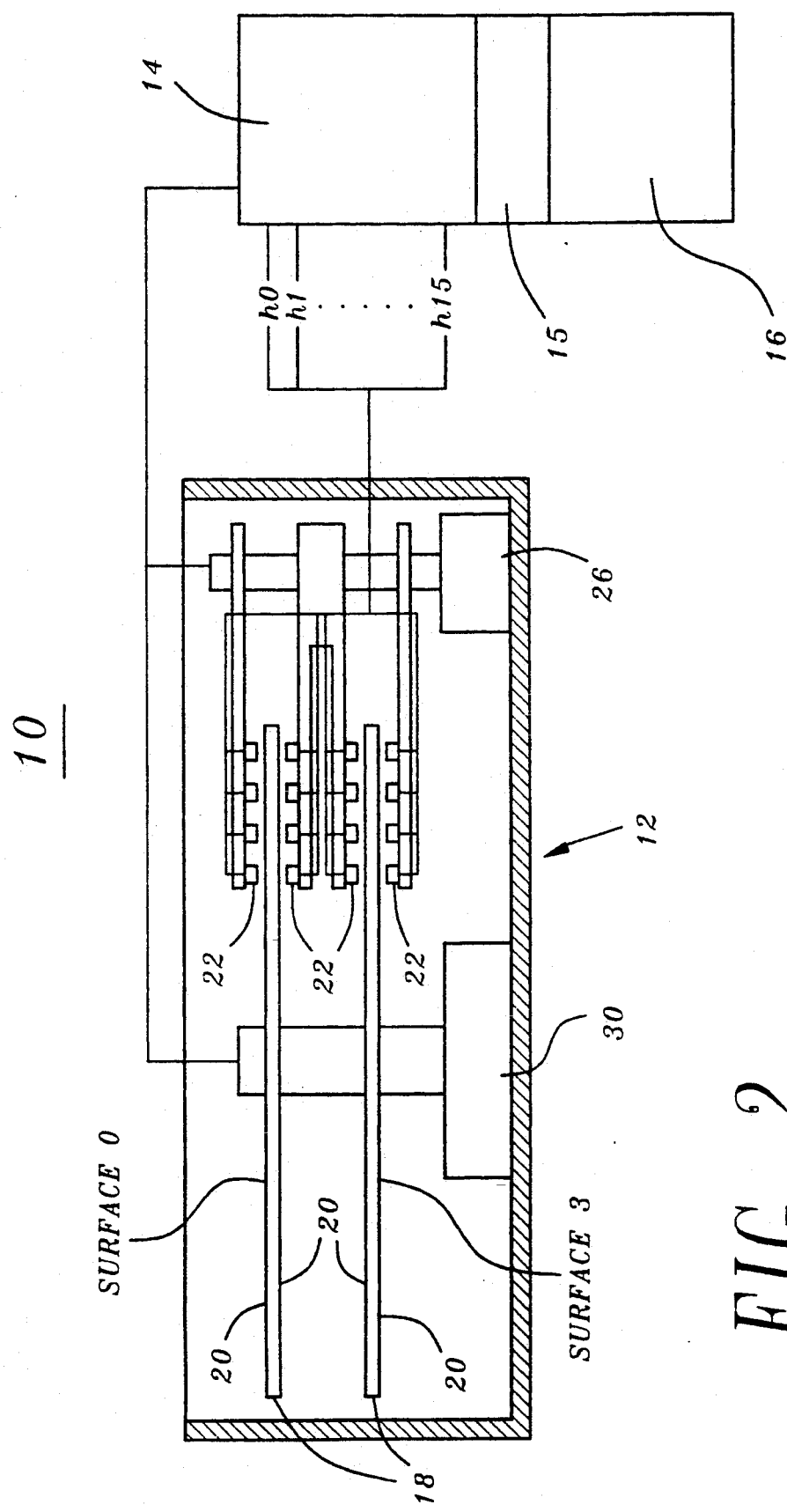

FIG.-2 shows an illustrative, partially schematic diagram of a four surface and sixteen head disk storage system of this invention. The parallel write and/or read process of this invention is the same as for the previous eight head example. But in this case up to sixteen heads can be used in parallel concurrently.

A further significant benefit of plural heads per surface of this invention is a reduction in cylinder skew time delay and hence in track seek time. For example, if the data surface is evenly divided among the plural heads per surface, each head would be assigned only the corresponding fraction of surface tracks to move across. This reduces the average seek time by the same factor as the number of heads per surface since the geometrical distance the heads are required to travel is proportionally less.

The parallel data encoding of this invention might pose problems for computer operating systems. The specific location of writing and or reading of data digits within the disk drive unit could be under the control of the computer operating system, in which case the operating system software would have to be specifically written for that purpose.

However, the parallel method of this invention could be also made transparent to the operating system by being built into the interface and be compatible with common operating systems. One way of having this invention compatible with common operating systems is for the interface electronics to make the drive look like fewer heads but more sectors, a process known in the industry as "drive translation". For example, with eight heads and surfaces of FIG-1., eight data digits or bits encoded in parallel could be made to look to the operating system as stored on a single high density surface with eight times the number of usual 512 byte sectors. The disk drive illustrated in FIG.-2 could be translated to look like two surfaces with eight times the number of sectors or even one surface with sixteen times the normal sectors.

While the invention has been particularly shown and described with reference to preferred embodiments thereof, it will be understood by those skilled in the art that various changes in form and details may be made therein without departing from the spirit and scope of the invention.

What is claimed is:

1. A high performance disk storage system comprising:
    at least one disk with each disk having two surfaces, said disks being mounted coaxially, said disks having at least one surface with corresponding head for reading or writing data digits, said disk storage system having at least two heads; said disk storage system comprising disk means containing stored data, wherein data is stored on said disk means of said disk storage system in the form of data digits, each data digit being written to the surfaces by a plurality of different heads at or about the same time during a write cycle, each said data digit being read from the surfaces by said plurality of different heads at or about the same time during a read cycle;
    means coupled to said plurality of different heads for reading/writing the data digits from/to the disk means thereof and for producing the data digits electrical signals corresponding thereto;
    wherein each said data digit comprises a binary bit; wherein the digits are written to or read from said disk means in parallel.

* * * * *